United States Patent [19]
Bleier

[11] Patent Number: 5,335,111
[45] Date of Patent: Aug. 2, 1994

[54] HOLLOW RETROREFLECTOR ASSEMBLY WITH HARD MOUNT ASSEMBLY

[75] Inventor: Zvi Bleier, Comack, N.Y.

[73] Assignee: PLX Inc., Deer Park, N.Y.

[21] Appl. No.: 52,043

[22] Filed: Apr. 22, 1993

[51] Int. Cl.$^5$ .............................................. G02B 5/122
[52] U.S. Cl. ................................... 359/529; 359/515; 359/546; 359/553
[58] Field of Search ................. 359/529, 515, 546, 553

[56] References Cited

U.S. PATENT DOCUMENTS

| | | | |
|---|---|---|---|
| 2,432,984 | 12/1947 | Budenbom | 359/529 |
| 3,663,084 | 3/1972 | Lipkins | 359/529 |
| 3,833,893 | 9/1974 | Rajchman | 359/529 |
| 3,977,765 | 8/1976 | Lipkins | 359/529 |
| 4,065,204 | 12/1977 | Lipkins | 359/529 |
| 4,319,804 | 3/1982 | Lipkins | 359/529 |
| 5,024,514 | 6/1991 | Bleier | 359/529 |
| 5,122,901 | 6/1992 | Bleier | 359/529 |

FOREIGN PATENT DOCUMENTS

| | | | |
|---|---|---|---|
| 25650 | 2/1977 | Japan | 359/529 |
| 21856 | of 1904 | United Kingdom | 359/529 |

*Primary Examiner*—Loha Ben
*Assistant Examiner*—Michael A. Papalas
*Attorney, Agent, or Firm*—Gottlieb, Rackman & Reisman

[57] ABSTRACT

An improved hollow retroreflector assembly with a hard mount assembly is provided, comprising a hollow retroreflector assembly adhered onto a mounting member. The hollow retroreflector has three plates having optically flat reflective surfaces disposed at right angles to each other and non-reflective surfaces opposite to the reflective surfaces of the plates. Each of the plates has first and second sides disposed at right angles to each other, the first side of each plate abutting and being adhered to the reflective surface of the plate adjacent to it. The mounting member has first and second receiving surfaces disposed at right angles to each other. The first receiving surface has adhered to it a portion of the first side of one of the plates, and the second receiving surface has adhered thereto a portion of the second side of the same plate. The mounting member also has a base member having a threaded bore extending therein for receipt of a correspondingly threaded member extending from a support.

42 Claims, 2 Drawing Sheets

HOLLOW RETROREFLECTOR ASSEMBLY WITH HARD MOUNT ASSEMBLY

BACKGROUND OF THE INVENTION

This invention relates to the field of retroreflectors, and more particularly, to a hollow retroreflector assembly mounted on a mounting member.

Hollow retroreflectors are old in the art. Hollow retroreflectors are made of three plates joined together having optically flat reflective surfaces disposed at right angles to each other, and meeting at what can be described as a common inside corner of an imaginary cube. Hollow retroreflectors in general have the essential property of causing incident and reflected light rays to travel along parallel paths.

When hollow retroreflectors are assembled for high accuracy and precision it is always essential to ensure that the reflective surfaces remain mutually perpendicular and sometimes essential to ensure that the retroreflector assembly as a whole does not move.

The perpendicularity of the reflective surfaces is affected by external stresses. Examples of such external stresses are thermal expansion or contraction of the substrate material from which the retroreflector is made, deflection caused by curing of the adhesives which join members of the retroreflector and/or mass. Accordingly, it is desirable to assemble a hollow retroreflector in such a manner as to reduce the stresses, and also to have a mounting assembly which does not add to these stresses and securely retains the retroreflector thereon. Examples of hollow retroreflector mounting assemblies which have proven successful in maintaining the reflective surfaces in their perpendicular orientations are:

U.S. Pat. No. 3,977,765, to Morton S. Lipkins, which discloses a hollow retroreflector mounted to a support structure through means of applying an adhesive into the joints formed between joined members of the retroreflector and a flat surface of the support structure. This method of mounting the hollow retroreflector ensures that the stresses associated with the curing of the adhesive are primarily translated along the reflective surfaces, not in such a manner as to cause deflection of those surfaces; and U.S. Pat. No. 5,122,901, to Zvi Bleier, which discloses a hollow surveying retroreflector assembly having a hollow retroreflector mounted within a receptacle. The receptacle has a conically configured interior for receiving the retroreflector and for maintaining the perpendicular alignment of the reflective surfaces of the plates of the retroreflector. The receptacle is then received within an outer casing to allow for mounting of the entire assembly.

The present hollow retroreflector assembly with hard mount assembly also achieves secure mounting of the retroreflector without applying stresses which would deflect the reflective surfaces, while also keeping the retroreflector from moving. Specifically, it is often important when measuring distances using a retroreflector to reduce to a minimum any fluctuations (however small) which may occur because of movement of the retroreflector between successive measurements due to the external stresses of mass and/or temperature change. The mounting assembly of the present invention reduces this movement to a minimum.

The mounting assembly also allows for easy and secure mounting of the retroreflector onto a support.

SUMMARY OF THE INVENTION

In accordance with the invention, an improved hollow retroreflector assembly with a hard mount assembly is provided. The hollow retroreflector assembly of the invention is adhered onto a mounting member which does not cause the reflective surfaces of the retroreflector to be deflected due to stress and significantly reduces movement of the retroreflector in order to achieve high accuracy in distance measurements. The mounting assembly also allows for easy and secure mounting of the retroreflector to a support.

The hollow retroreflector has three plates having optically flat reflective surfaces disposed at right angles to each other and non-reflective surfaces opposite to the reflective surfaces of the plates. Each of the plates also has first and second sides disposed at right angles to each other, the first side of each plate abutting and being adhered to the reflective surface of the plate adjacent to it.

The mounting member has first and second receiving surfaces disposed at right angles to each other. The first receiving surface has adhered to it a portion of the first side of one of the plates, and the second receiving surface has adhered to it a portion of the second side of the same plate. Accordingly, the retroreflector is mounted to the mounting member from only one of the three plates.

The mounting member also has a base member having a threaded bore extending therein for receipt of a correspondingly threaded member extending from a support. This system ensures easy and secure mounting to the support structure.

Accordingly, it is an object of the invention to provide an improved hollow retroreflector assembly with a hard mount assembly.

Another object of the invention is to provide a hollow retroreflector assembly with a hard mount assembly which causes minimal external stresses to the reflective surfaces of the retroreflector.

Still another object of the invention is to provide a hollow retroreflector assembly with a hard mount assembly wherein the assembly achieves significant reductions in movement of the assembly in order to achieve high-accuracy distance measurements.

Yet a further object of the invention is to provide a hollow retroreflector assembly with a hard mount assembly wherein the mounting of the entire assembly to a support structure is easy and secure.

Other objects of the invention will in part be obvious and will in part be apparent from the following description.

The invention accordingly comprises an assembly possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
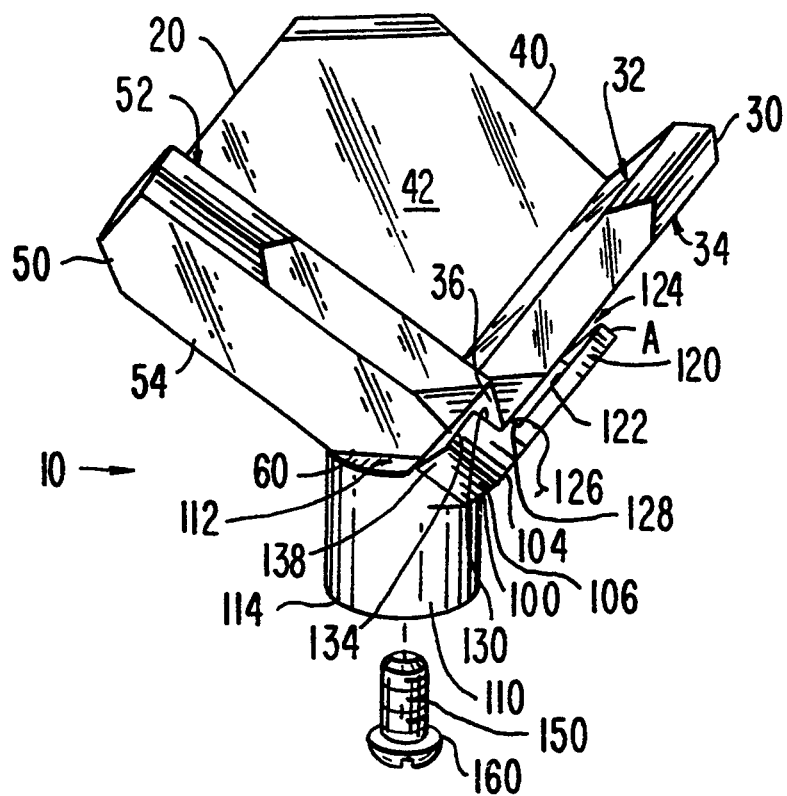
FIG. 1 is a perspective view of a hollow retroreflector assembly with a hard mount assembly made in accordance with the invention.
Figure 2:
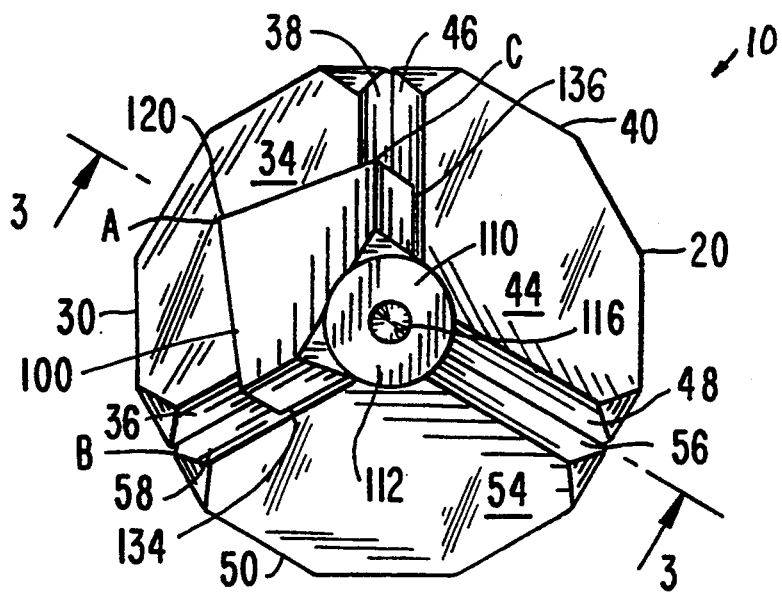
FIG. 2 is a bottom plan view of the assembly of FIG. 1.

Referring to FIGS. 1 and 2, a hollow retroreflector assembly having a hard mount assembly made in accordance with the invention and generally designated as 10, is illustrated. Assembly 10 includes a hollow retroreflector 20 and a mounting member 100. Retroreflector 20 is preferably made of fused quartz or fine annealed pyrex, while mounting member 100 is preferably made of a metal alloy having a very low coefficient of thermal expansion, such as INVAR.

Hollow retroreflector 20 is comprised of a first plate 30, a second plate 40, and a third plate 50. Each of the plates 30, 40 and 50 has a corresponding reflective surface 32, 42 and 52. Plates 30, 40 and 50 are disposed at right angles to each other, and therefore reflective surfaces 32, 42 and 52 are also disposed at right angles to each other. Each of plates 30, 40 and 50 also has non-reflective surfaces 34, 44 and 54 which are opposite to reflective surfaces 32, 42 and 52, as best seen in FIGS. 1 and 2.

Hollow retroreflector 20 is designed to receive an incoming (incident) light ray (not shown) and reflect the light ray off of the reflective surfaces 32, 42 and 52 and out from retroreflector 20 along a path parallel to the incident light ray. Of course, the incident light ray can initially strike any one of the reflective surfaces, without bearing upon the accuracy of the parallelism of the reflected light ray. Since parallelism of the incident and reflected light rays is a primary purpose of a retroreflector, a high degree of precision must be maintained with respect to the perpendicularity of reflective surfaces 32, 42 and 52.

The construction of hollow retroreflector 20 is old in the art, as disclosed in U.S. Pat. No. 3,663,084 to Morton S. Lipkins, and as substantially disclosed in U.S. Pat. No. 5,122,901 to Zvi Bleier, which patents are hereinafter incorporated by reference. Briefly describing this construction, each of plates 30, 40 and 50 of hollow retroreflector 20 has first and second sides 36 and 38, 46 and 48 and 56 and 58, respectively. The first and second sides of each of the plates are perpendicular to each other and to each of the other sides of the other plates. As is seen best in FIGS. 2, 4, 5 and 6, first side 46 of plate 40 is abutted against and adhered to reflective surface 32 of plate 30, first side 36 of plate 30 is abutted against and adhered to reflective surface 52 of plate 50, and first side 56 of plate 50 is abutted against and adhered to reflective surface 42 of plate 40. Accordingly, each of plates 30, 40 and 50 is simultaneously an abutting plate at first sides 36, 46 and 56, and an adjacent plate at second sides 38, 48 and 58. Therefore, first sides 36, 46 and 56 of the abutting plates abut reflective surfaces 52, 32 and 42 of their corresponding adjacent plates, respectively.

Figure 3:
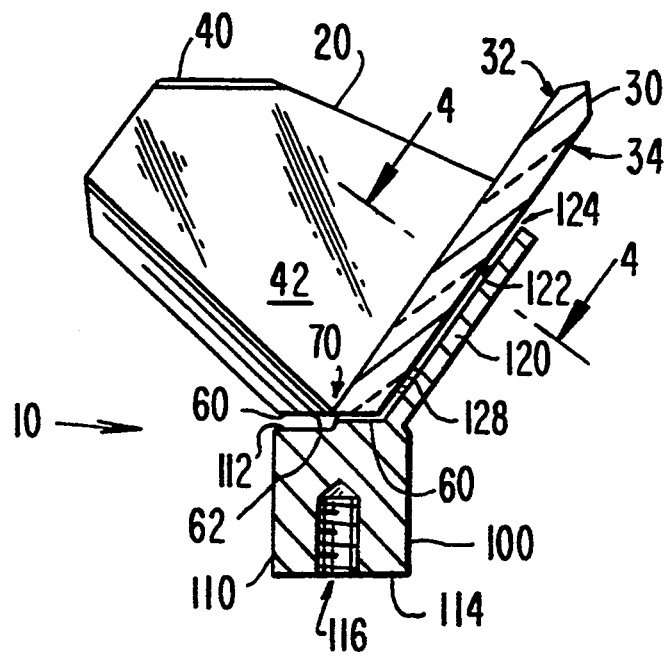
FIG. 3 is a cross-sectional view taken along line 3—3 of FIG. 2.
Figure 5:
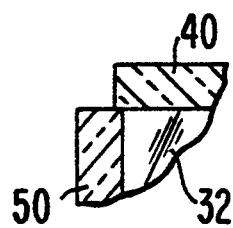
FIG. 5 is a cross-sectional view taken along line 5—5 of FIG. 4.

As is best seen in FIGS. 1 and 3, the intersection of reflective surfaces 32, 42 and 52 forms a common inside corner 70. Opposite to common inside corner 70 is outside surface 62 which is formed by chamfer areas 60 on each of plates 30, 40 and 50.

As seen in FIG. 3, chamfer areas 60 are areas of reduced thickness of the plates; the thickness of each of the plates being measured as the distance between their reflective and non-reflective surfaces. It is also seen in FIG. 3 that the thickness of the plates at chamfer areas 60 is reduced from a maximum thickness at each of the non-reflective surfaces, to a minimum thickness proximate each of the reflective surfaces. Additionally, FIG. 3 shows that chamfer areas 60 are proximate each other when retroreflector 20 is assembled, so that a non-optically flat outside surface 62 is formed below common inside corner 70, and proximate to a first side 112 of base member 110, as will be discussed in more detail below.

Turning now to a discussion of mounting member 100, as best seen in FIGS. 1-4, mounting member 100 has an upper member 104 and a base member 110. Base member 110 is cylindrical in shape, but may be any shape. Base member 110 has a first side 112 and a second side 114 opposite to first side 112. As seen in FIGS. 1 and 3, first side 112 is non-optically flat and is hemispherical in shape because upper member 104 extends out of base member 110.

As seen in FIG. 3, base member 110 has extending therein bore 116. Bore 116 extends through second side 114, but may be placed anywhere on base member 110. Bore 116 is threaded to receive a correspondingly threaded member 150 extending from support 160, see FIG. 1. However, it is understood that instead of having bore 116, base member 110 may have an outwardly extending threaded member which would in turn be received by a cooperating threaded bore on the support structure. Additionally, other mounting means are intended to be encompassed in the invention, such as the use of a clamp from the support structure to securely hold base member 110.

Turning now to a discussion of upper member 104, as best seen in FIGS. 1 and 2, upper member 104 has a partial diamond shape; one point of the diamond not existing since that location is where upper member 104 joins base member 110.

Upper member 104 has two block members 106 which are at right angles to each other; extending from points B and C of the diamond shape of upper member 104 towards base member 110, see FIG. 2. The uppermost surfaces of block members 106 are first and second receiving surfaces 130 and 132. Receiving surfaces 130 and 132 are perpendicular; first receiving surface 130 abutted against and adhered to first side 36 of plate 30 and second receiving surface 132 abutted against and adhered to second side 38 of plate 30, see FIGS. 1 and 2. A rigid adhesive (not shown), preferably an epoxy based material, is applied between first and second receiving surfaces 130 and 132 and first and second sides 36 and 38, to adhere retroreflector assembly 20 to mounting member 100. The adhesive is more rigid than silicone based adhesives previously used in mounting retroreflectors. This decreases the "cushiony", "rubbery" effect associated with silicone adhesives, thereby significantly reducing tendencies of retroreflector assembly 20 to move due to forces from mass and/or temperature changes while mounted on mounting member 100.

Figure 4:
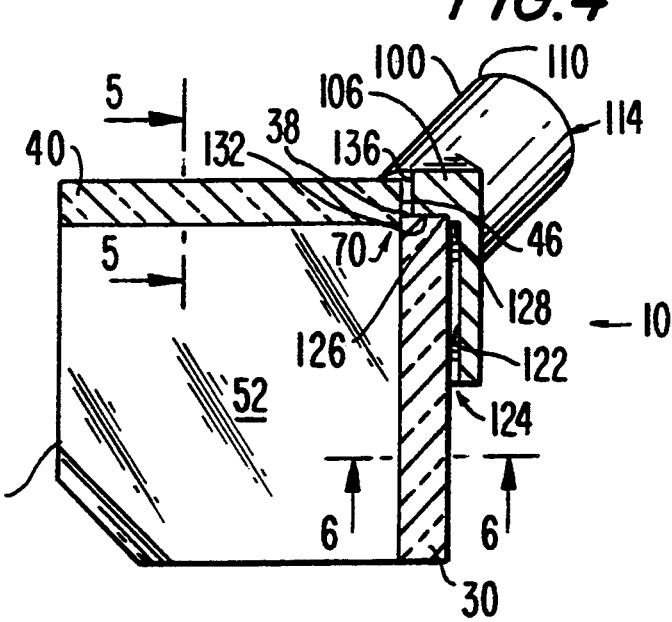
FIG. 4 is a cross-sectional view taken along line 4—4 of FIG. 3.
Figure 6:
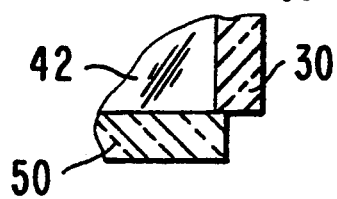
FIG. 6 is a cross-sectional view taken along line 6—6 of FIG. 4.

Continuing with base member 110, and more particularly, upper member 104, as seen in FIGS. 1 and 4, extending from block members 106 and first and second receiving surfaces 130 and 132, are ridges 126. Ridges 126 abut against, but are not adhered to, first non-reflective surface 34 of plate 30. At the top of ridge 126, ledge 128 extends away from non-reflective surface 34. Wall member 120 of upper member 104 extends from ledge 128, and forms the uppermost part of upper member 104 extending from the point at which first and second sides 36 and 38 of plate 30 meet at chamfer area 60 all the way to point A of upper member 104, see FIG. 2.

Wall member 120 has inside surface 122. Due to the nature of the mounting of retroreflector assembly 20 onto receiving surfaces 130 and 132 of upper member 104, a space 124 is defined between non-reflective surface 34 and inner surface 122.

It will finally be seen in FIGS. 1, 2 and 4, that block members 106 only touch retroreflector assembly 20 along receiving surfaces 130 and 132. Specifically, non-receiving surfaces 134 and 136 extend at right angles from receiving surfaces 130 and 132, respectively. Spaces 138 and 140 are formed between non-receiving surfaces 134 and 136 and second side 58 of plate 50 and first side 46 of plate 40, respectively, see FIG. 2. Accordingly, receiving surfaces 130 and 132 end at non-receiving surfaces 134 and 136 so that block members 106 will not touch retroreflector assembly 20 at any other points except for receiving surfaces 130 and 132.

It will therefore be seen that retroreflector assembly 20 is mounted to mounting member 100 only along first and second sides 36 and 38 of first plate 30. This method of mounting retroreflector 20 to mounting member 100 ensures both ease of mounting and security of mounting, while also preventing distortion of reflective surface 32 (and therefore of reflective surfaces 42 and 52) so as to maintain reflective surfaces 32, 42 and 52 in perpendicular planes to each other.

It will also be seen that the manner of mounting retroreflector assembly 20 to mounting member 100 achieves substantial rigidity between retroreflector assembly 20 and receiving surfaces 130 and 132. The low coefficient of thermal expansion metal alloy material which makes up mounting member 100 significantly reduces the effects of thermal expansion/contraction of mounting member 100 so as to substantially minimize these effects on the placement of retroreflector assembly 20.

Additionally, a silicone based adhesive is not used between first and second sides 36 and 38 and first and second receiving surfaces 130 and 132, respectively. Use of silicone as an adhesive at these areas would create a flexible mount which would be adversely affected by temperature changes and which would move (settle) due to the weight of retroreflector assembly 20. Therefore, the preferred adhesive is a more rigid adhesive, such as an epoxy adhesive, to secure retroreflector assembly 20 to mounting member 100.

Accordingly, the use of a rigid adhesive (such as epoxy) to adhere retroreflector 20 to mounting member 100, and a metal alloy having a low coefficient of thermal expansion for mounting member 100, significantly reduces the effects of mass and thermal expansion/contraction on assembly 10. In this way, assembly 10 can be used in high precision distance measurements without the worry that at each new reading the distance will vary due to a shift in the position of assembly 10 from either mass or temperature considerations.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A retroreflector assembly comprising:
   a retroreflector comprising three plates having optically flat reflective surfaces disposed at right angles to each other, wherein each of said plates has first and second sides disposed at right angles to each other, said first side of each of said plates abutting and being joined to said reflective surface of said plate adjacent to said abutting plate; and
   a mounting member adapted for mounting said retroreflector thereon, comprising first and second receiving surfaces disposed at right angles to each other, wherein said first receiving surface has adhered thereto a portion of said first side of one of said plates and said second receiving surface has adhered thereto a portion of said second side of said one of said plates.

2. A retroreflector assembly as recited in claim 1, wherein said mounting member further comprises means for attaching said retroreflector assembly to a support.

3. A retroreflector assembly as recited in claim 2, wherein said attaching means comprises a base member having a first side proximate to said retroreflector and a second side opposite said first side.

4. A retroreflector assembly as recited in claim 3, wherein said base member has a bore extending therein.

5. A retroreflector assembly as recited in claim 4, wherein said bore extends from said second side toward said first side of said base member.

6. A retroreflector assembly as recited in claim 5, wherein said bore is threaded for receipt of a substantially correspondingly threaded member extending from said support.

7. A retroreflector assembly as recited in claim 3, wherein each of said plates further has a non-reflective surface opposite to said reflective surface.

8. A retroreflector assembly as recited in claim 7, wherein said reflective surfaces of said plates meet at a common inside corner.

9. A retroreflector assembly as recited in claim 8, wherein said first and second sides and said non-reflective surface of each of said plates meet at a chamfer area wherein a thickness of said plate, as measured between said reflective surface and said non-reflective surface, is reduced.

10. A retroreflector assembly as recited in claim 9, wherein said reduced thickness of each of said plates is thinner at said chamfer area closer to said reflective surface and thicker at said chamfer area closer to said non-reflective surface.

11. A retroreflector assembly as recited in claim 9, wherein said chamfer areas of said plates are proximate each other below said common inside corner, forming a substantially non-optically flat outside surface proximate to said first side of said base member.

12. A retroreflector assembly as recited in claim 7, wherein each of said first and second receiving surfaces has an upwardly extending ridge.

13. A retroreflector assembly as recited in claim 12, wherein said upwardly extending ridge abuts a portion of said non-reflective surface of said one of said plates.

14. A retroreflector assembly as recited in claim 13, wherein said mounting member further comprises a wall member which is substantially parallel to said non-reflective surface of said one of said plates.

15. A retroreflector assembly as recited in claim 14, wherein said wall member is smaller than said one of said plates.

16. A retroreflector assembly as recited in claim 14, wherein said wall member has an inner surface proximate to said non-reflective surface.

17. A retroreflector assembly as recited in claim 16, wherein a space is defined between said non-reflective surface and said inner surface when said retroreflector is mounted on said mounting member.

18. A retroreflector assembly as recited in claim 17, wherein a ledge surface extending between said ridge of each of said first and second receiving surfaces and said inner surface of said wall member defines a depth of said space.

19. A retroreflector assembly as recited in claim 1, wherein said mounting member further comprises first and second non-receiving surfaces respectively adjacent to and substantially perpendicular to said first and second receiving surfaces.

20. A retroreflector assembly as recited in claim 19, wherein a first space is defined between said first non-receiving surface and said second side of said plate adjacent to said one of said plates, and wherein a second space is defined between said second non-receiving surface and said first side of said plate abutting said reflective surface of said one of said plates.

21. A retroreflector assembly as recited in claim 1, wherein said mounting member is made of a metal alloy having a low coefficient of thermal expansion.

22. A retroreflector assembly as recited in claim 1, wherein an adhesive is used to adhere said first receiving surface to a portion of said first side of said one of said plates and said second receiving surface to a portion of said second side of said one of said plates.

23. A retroreflector assembly as recited in claim 22, wherein said adhesive is rigid.

24. A retroreflector assembly as recited in claim 23, wherein said rigid adhesive is epoxy.

25. For a retroreflector having three plates having optically flat reflective surfaces disposed at right angles to each other, a mounting member adapted for mounting said retroreflector thereon along one of said three plates, said mounting member comprising first and second receiving surfaces for mounting said one of said plates and means for attaching said mounting member to a support.

26. A mounting member as recited in claim 25, wherein said attaching means comprises a base member having a first side adapted to be proximate to said retroreflector and a second side opposite said first side.

27. A mounting member as recited in claim 26, wherein said base member has a bore extending therein.

28. A mounting member as recited in claim 27, wherein said bore extends from said second side toward said first side of said base member.

29. A mounting member as recited in claim 28, wherein said bore is threaded for receipt of a substantially correspondingly threaded member extending from said support.

30. A mounting member as recited in claim 25, wherein each of said first and second receiving surfaces has an upwardly extending ridge.

31. A mounting member as recited in claim 30, wherein said upwardly extending ridge is adapted to abut at least a portion of said one of said plates.

32. A mounting member as recited in claim 31, wherein said mounting member further comprises a wall member adapted to be substantially parallel to a non-reflective surface of said one of said plates, said non-reflective surface being opposite said reflective surface.

33. A mounting member as recited in claim 32, wherein said wall member is adapted to be smaller than said one of said plates.

34. A mounting member as recited in claim 33, wherein said wall member has an inner surface adapted to be proximate to said non-reflective surface.

35. A mounting member as recited in claim 25, wherein said mounting member further comprises first and second non-receiving surfaces respectively adjacent to and substantially perpendicular to said first and second receiving surfaces, said first and second non-receiving surfaces adapted to be independent of said retroreflector.

36. A mounting member as recited in claim 25, wherein said mounting member is made of a metal alloy having a low coefficient of thermal expansion.

37. A mounting member as recited in claim 25, wherein said first and second receiving surfaces are at right angles to each other and are adapted for having adhered thereto portions of first and second sides of said one of said plates.

38. A mounting member as recited in claim 37, wherein an adhesive is used to adhere said first receiving surface to a portion of said first side of said one of said plates and said second receiving surface to a portion of said second side of said one of said plates.

39. A mounting member as recited in claim 38, wherein said adhesive is rigid.

40. A mounting member as recited in claim 39, wherein said rigid adhesive is epoxy.

41. A method of assembling a retroreflector assembly, comprising the steps of:
assembling a retroreflector by disposing three plates, having optically flat reflective surfaces, at right angles to each other, said plates further having first and second perpendicular sides;
adhering said retroreflector to a mounting member by:
a) attaching a portion of said first side of one of said plates to a first receiving surface of said mounting member; and
b) attaching a portion of said second side of said one of said plates to a second receiving surface of said mounting member, said second receiving surface being perpendicular to said first receiving surface.

42. A method of assembling a retroreflector assembly as recited in claim 41, wherein said adhering step further comprises the step of abutting a portion of a non-reflective surface of said one of said plates opposite its reflective surface, against ridges extending from said first and second receiving surfaces.

* * * * *